(12) United States Patent
Zeng et al.

(10) Patent No.: US 11,537,433 B2
(45) Date of Patent: Dec. 27, 2022

(54) RESOURCE AND ASSET LIFECYCLE COSTING

(71) Applicant: Kyndryl, Inc., New York, NY (US)

(72) Inventors: Sai Zeng, Yorktown Heights, NY (US); Braulio Gabriel Dumba, White Plains, NY (US); Matthew Staffelbach, Indianapolis, IN (US); Liang Liu, Beijing (CN); Emrah Zarifoglu, Austin, TX (US); Umar Mohamed Iyoob, Pflugerville, TX (US); Manish Mahesh Modh, Cedar Park, TX (US)

(73) Assignee: Kyndryl, Inc., New York, NY (US)

( * ) Notice: Subject to any disclaimer, the term of this patent is extended or adjusted under 35 U.S.C. 154(b) by 114 days.

(21) Appl. No.: 17/161,988

(22) Filed: Jan. 29, 2021

(65) Prior Publication Data

US 2022/0244994 A1 Aug. 4, 2022

(51) Int. Cl.
*G06F 9/50* (2006.01)
*G06F 9/38* (2018.01)

(52) U.S. Cl.
CPC .......... *G06F 9/5011* (2013.01); *G06F 9/3836* (2013.01); *G06F 9/505* (2013.01); *G06F 9/5038* (2013.01)

(58) Field of Classification Search
CPC .................................................. G06F 9/5038
See application file for complete search history.

(56) References Cited

U.S. PATENT DOCUMENTS

| | | | |
|---|---|---|---|
| 8,918,510 B2 | 12/2014 | Gmach et al. | |
| 9,442,669 B2 | 9/2016 | Nicolae | |
| 9,800,477 B2 | 10/2017 | Burton et al. | |
| 2015/0156077 A1* | 6/2015 | Gao | H04L 41/0677 709/223 |

(Continued)

FOREIGN PATENT DOCUMENTS

CN 106257524 12/2016

OTHER PUBLICATIONS

AZURE, "Cost Predicting and Optimizing Spending", Testprep Training Tutorials, https://www.testpreptraining.com/tutorial/microsoft-azure-fundamentals-az-900/azure-cost-prediction-and-optimizing-spending/ (Sep. 2020).

(Continued)

*Primary Examiner* — Charlie Sun
(74) *Attorney, Agent, or Firm* — Lieberman & Brandsdorfer, LLC

(57) ABSTRACT

A system, computer program product, and method to deriving a cost model and dynamic adjustment of the derived model responsive to dynamic modification of one or more of the resources in a hybrid shared resource environment. Resources and corresponding configuration information are collected while monitoring runtime utilization of resource performance. As changes to the resources are discovered, the changes are subject to an assessment. A hybrid cost model is derived and configured to account for the one or more resources. The derived hybrid cost model is leveraged to conduct a multi-dimensional resource evaluation of the assessed changed configuration information. Responsive to (Continued)

the multi-dimensional evaluation, a generated resource utilization optimization of the one or more resources is selectively implemented.

20 Claims, 9 Drawing Sheets

(56) References Cited

U.S. PATENT DOCUMENTS

2016/0381134 A1\* 12/2016 Ljubuncic ............... G06F 21/70
                                                       709/224
2018/0300740 A1    10/2018 Chandrashekar et al.

OTHER PUBLICATIONS

Anonymous, "System and Method for Granular and Dynamic Cost Management of Cloud Resources", IPCOM000230899D, Sep. 17, 2013.

Cho, KyungWoon, et al., "A Cost Estimation Model for Cloud Services and Applying to PC Laboratory Platforms", www.mdpi.com/jounral/processes, Jan. 7, 2020.

Cao, Bin, et al., "Dynamic Pricing for Resource Consumption in Cloud Service", Hindawi, Wireless Communications and Mobile Computing, vol. 2018, Article IP 4263831, May 24, 2018.

\* cited by examiner

RESOURCE AND ASSET LIFECYCLE COSTING

BACKGROUND

The present embodiments relate to resource lifecycle costing in a hybrid shared resource environment. More specifically, the embodiments relate to deriving a costing model and dynamic adjustment of the derived model responsive to dynamic modification of one or more of the resources.

Cloud computing is a model which enables ubiquitous, convenient, on-demand network access to a shared pool of configurable computing resources, e.g. networks, servers, applications, and services, that can be rapidly provisioned and released. Information technology (IT) relates to aspects of managing and processing information. When a service is requested, a corresponding management platform provides provisioning of resources in the computing environment. In an exemplary embodiment, a virtual machine (VM) and one or more applications running on the VM may be provisioned or installed to support and enable the requested service.

It is understood that provisioning services have an underlying cost, referred to herein as a service cost. Current implementation of a cost model to estimate resource provisioning costs is conducted during set-up of the resources being provisioned, with planning specifications.

SUMMARY

The embodiments include a system, computer program product, and method for dynamically deriving a multi-faceted cost model, and dynamic adjustment of the derived model responsive to run-time aspects of the resources in a shared resource environment.

In one aspect, a computer system is provided with a processor operatively coupled to memory and a knowledge engine. The knowledge engine is configured with one or more tools in the form of a collection module, a discovery module, a cost module, and a director, to support resource management. The collection module is configured to collect one or more resources, and their corresponding configuration information while monitoring runtime utilization of resource performance. The discovery module is configured to discover any changes to the resources, and assess changed configuration information corresponding to the discovered change(s). The cost module is configured to derive a cost model to account for the one or more resources, and to leverage the derived cost model as a component of a multi-dimensional resource evaluation and generate a resource utilization optimization as output.

In another aspect, a computer program product is provided to support runtime resource management. The computer program product includes a computer readable storage medium having program code embodied therewith. Program code, which is executable by a processor, is provided to collect one or more resources and their corresponding configuration information while monitoring runtime utilization of their performance. As changes to the resources are discovered, changed configuration information corresponding to the changed resources is subject to an assessment. The program code is configured to derive a cost model to account for the one or more resources. The derived cost model is leveraged as a component of a multi-dimensional resource evaluation, and is configured to generate a resource utilization optimization as output.

In yet another aspect, a method is provided to dynamically support resource management. One or more resources are collected together with corresponding configuration information, while monitoring runtime resource utilization. As one or more changes to the resources are discovered, corresponding change configuration information is subject to an assessment. A cost model configured to account for the one or more resources is derived. The cost model is leveraged to conduct a multi-dimensional resource evaluation of the assessed changed configuration information. Responsive to the multi-dimensional evaluation, a resource utilization optimization is generated.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

Figure 1:
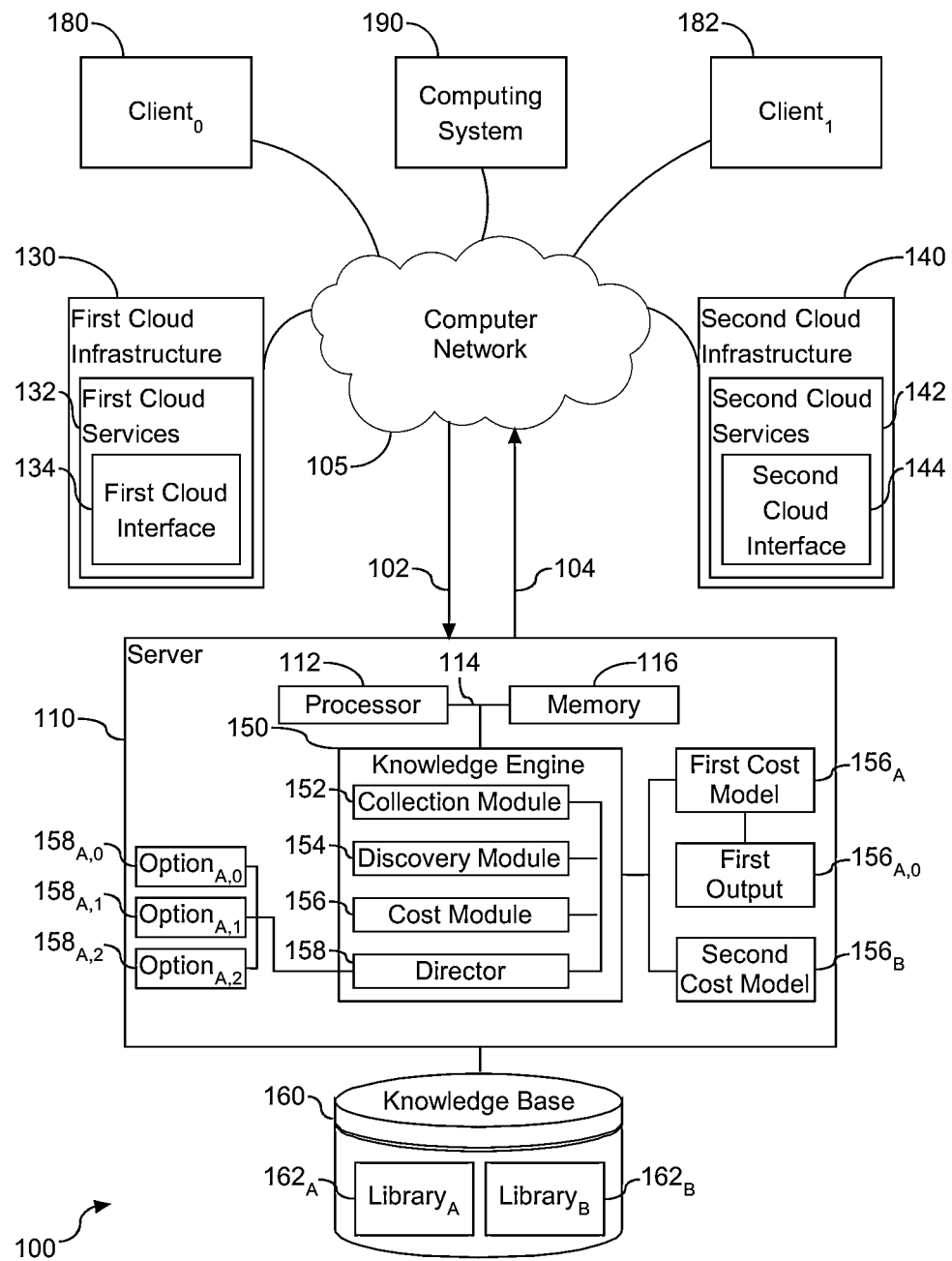
FIG. 1 depicts a schematic diagram of a computer system and embedded tools to support dynamic resource costing in an information technology (IT) infrastructure.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

The embodiments shown and described herein are directed at a dynamic costing model for services offered in a distributed resource computing environment, also referred to herein as a cloud-computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Examples of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

As shown and described herein, deployment refers to a set of activities to be performed in order to make a software application or service available and usable. Such activities may include provisioning, de-provisioning, installation, configuration, activation, de-activation, versioning, updating, and/or modifying an attribute. The embodiments shown and described herein are directed to deployment of physical and virtual resources in a cloud-computing environment to support services directed to data and applications. Such virtual resources may include, but are not limited to, virtual processor, virtual storage, and virtual networking components. Such virtual resources may be provisioned and configured as needed to host a requested application(s) and service(s). The cloud-computing environment may include a cloud-management platform to manage cloud-computing services. In an exemplary embodiment, the cloud-management platform may provision services as a function of characteristics of one or more virtual machines (VMs) and/or an application running on a VM. Accordingly, provisioning a service may include a combination of physical and virtual resources that may comprise one or more computers, communications resources, application software, peripheral devices, and other resources related to any of these resources, and combinations thereof.

A hybrid cloud infrastructure is a composition of two or more distinct cloud infrastructure, e.g. private, community, or public, that remain unique entities, but are bound together by standardized or proprietary technology that enables data and application portability. Referring to FIG. 1, a schematic diagram of a computer system (100) is provided with tools for dynamic resource costing in a hybrid cloud environment.

As shown, a server (110) is provided in communication with two cloud infrastructures (130) and (140) across a network connection (105). In an exemplary embodiment, cloud infrastructure (130) represents a first cloud infrastructure with corresponding first cloud services (132) and cloud infrastructure (140) represents a second cloud infrastructure and corresponding second cloud services (142). Although only two cloud infrastructures (130) and (140) are shown operatively coupled to the server (110), the quantity should not be considered limiting, and in an exemplary embodiment, the server (110) may be operatively coupled to multiple private and public cloud infrastructures. Cloud services (132) and (142) may be data processing resources provided as services by the cloud infrastructures (130) and (140), respectively. As shown, a first cloud interface (134) and a second cloud interface (144) are provided for the first and second cloud infrastructures (130) and (140), respectively. The interfaces function for provisioning respective cloud services. For example, cloud interfaces (134) and (144) may include different application programming interfaces (APIs) that are unique to each of the clouds (130) and (140), respectively. Accordingly, a cloud interface is provided to support and enable communication between each of the cloud infrastructures (130) and (140), respectively, and the server (110).

It is understood that an information technology environment is dynamic. Configuration of resources is subject to change on a continuous basis. At the same time, it is understood in the art that a costing model is implemented by cloud providers based on configuration of resources. As shown and described herein, a costing model is subject to optimization to account for the dynamic characteristics of configured resources, as well as not discoverable resources, e.g. middleware, application, government regulation compliant, etc. The server (110) is configured with a processor (112) in communication with memory (116) across a bus (114). The server (110) is shown with a knowledge engine (150) operatively coupled to the processor (112), with the knowledge engine (150) configured to dynamically support resource management. As shown, the knowledge engine (150) is configured with tools, shown and described herein as a collection module (152), a discovery module (154), a cost module (156), and a director (158). Although four tools are shown and described, the quantity of tools and their associated titles should not be considered limiting. The server (110) communicates with cloud infrastructures (130) and (140) across a network connection (105), and with other devices or components via one or more wired and/or wireless data communication links, where each communication link may comprise one or more of wires, routers, switches, transmitters, receivers, or the like. Other embodiments of the server (110) may be used with components, systems, subsystems, and/or devices other than those that are depicted herein.

The knowledge engine (150) is configured to receive input (102) from various sources, such as one or more of the client machines, across the network connection (105), or from an operatively coupled knowledge base (160). As shown herein, the knowledge base (160) is populated with two or more libraries, shown herein by way of example as $library_A$ (162$_A$) and $library_B$ (162$_B$). Although two libraries are shown herein, the quantity of libraries should not be considered limiting. In an exemplary embodiment, the libraries may be combined, or additional libraries may be provided. Each library is populated with data (not shown) corresponding to the operatively coupled to the first and second cloud infrastructures (130) and (140), respectively, and allocated resources. In an exemplary embodiment, the $library_A$ (162$_A$) stores data that corresponds to one or more resources and $library_B$ (162$_B$) stores data that corresponds to resource utilization. Examples of resources include, but are not limited to, virtual machines, servers, and similar computer resources. The knowledge base (160) is operatively coupled to the first and second cloud infrastructures (130) and (140), respectively. In an embodiment, data populated in $library_A$ (162$_A$) and $library_B$ (162$_B$) is obtained from the operatively coupled first and second cloud infrastructures (130) and (140), respectively. In an exemplary embodiment, data is automatically collected from the first and second cloud infrastructures (130) and (140), respectively, and populated in one or more of the respective libraries (162$_A$) and (162$_B$).

As shown herein, the knowledge engine (150) is provided with a collection module (152) configured to collect resource configuration information, and in an exemplary embodiment to perform the collection in parallel with monitoring runtime utilization of performance of the resources. In an exemplary embodiment, the collection module (152) leverages one or more information technology management tools, such as a hypervisor manager (not shown) and an endpoint automation tool (not shown), to obtain or otherwise collect the configuration information and performance at runtime. Similarly, in an embodiment, the collection manager (152) infers resource information through one or more custom attributes. In an exemplary embodiment, custom attributes are tags attached to resources or labels given to resources using information technology management tools from which the resource purpose or functionality can be derived, e.g., a virtual machine running a firewall is tagged or labelled "network_firewall". It is understood in the art that the resource(s) are dynamic in nature, and that they are subject to change either via configuration or re-configuration, or during runtime with change corresponding utilization. In an exemplary embodiment, such changes may be planned or unplanned.

The discovery module (154) functions to reveal or otherwise identify one or more changes to the resources subject to configuration information collection by the collection module (152). In addition, the discovery module (154) conducts an assessment of the configuration information, such as a disk size increase or decrease, as well as an assessment of resource performance. Different processes and sub-processes of models may be embodied by the discovery modules, including, but not limited to, a pull model and push model. The pull model is utilized to monitor, compare, and identify corresponding changes to the resources, and the push model is utilized to receive identified changes, such as one or more change events, from one or more information technology management tools. Accordingly, at the outset of the resource utilization optimization, the collection module (152) and the discovery module (154) identify resources, and corresponding runtime and configuration information.

Utilization of a resource has an associated usage cost. As any one of the resources is subject to change, it is understood that any corresponding cost or cost estimate may also be subject to change. More specifically, the cost or cost estimate is subject to dynamic modification corresponding to any discovered changes or configuration changes. The cost module (156) interfaces with the discovery module (154) to derive a cost model (156$_A$), also referred to herein as a hybrid cost model, and shown herein operatively coupled to the cost module (156). The derived cost model (156$_A$) is configured to account for the resource(s) that are being utilized. Once derived, the cost module (156) leverages the cost model ($156_A$) to conduct a multi-dimensional resource evaluation. In an exemplary embodiment, the evaluation is directed at the discovered changes associated with the collected resource information. Several cost models used by cloud providers are known in the art to assess costs associated with server hardware, license(s), maintenance, labor, network, and facilities. In an exemplary embodiment, the cost model ($156_A$) is derived from a hybrid of two or more cost models modified to address and incorporate the dynamic characteristics of the resources that are subject to change during utilization. The hybrid cost model derivation includes the cost module (156) identifying at least two known cost models based on current resource information. Accordingly, the cost module (156) conducts a multi-dimensional resource evaluation of the discovered changes that are related to the collected information, and derives the first cost model ($156_A$) from the evaluation.

The collection module (152) dynamically collects and obtains resource information during runtime, and applies the runtime information to the first derived model ($156_A$). The first cost model ($156_A$) is dynamic, and may be modified to accommodate the collected runtime information, e.g. runtime data. In an exemplary embodiment, the first cost model ($156_A$) measures hardware performance in view of the workload. The cost module (156) conducts an assessment of the derived first cost model ($156_A$) in view of the collected runtime information, and selectively and dynamically modifies the first cost model ($156_A$). As shown herein, a second derived cost model ($156_B$) is shown operatively coupled to the cost module (156), with the second derived model ($156_B$) representing a dynamic modification of the model ($156_A$), e.g. first model, with the second model incorporating modifications based on the collected runtime information. In an exemplary embodiment, the second model ($156_B$) incorporates aspects of custom attribute costing. The acting model, either the first cost model ($156_A$) or modifications to the first model as represented in the second model ($156_B$), is executed to conduct a resource evaluation, referred to herein as a multi-dimensional evaluation. This evaluation incorporates and addresses all discovered configuration changes as related to the collected resources. The evaluation is not merely directed at resource cost. Rather, the evaluation is directed at evolution of the costs based on evolved and dynamic characteristics, and resource optimization options in view of the costs. As shown herein, the director (158) is operatively coupled to the cost module (156). The director (158) leverages the evaluation conducted by the model, either the first cost model ($156_A$) or modifications as reflected in the second model ($156_B$), to identify any new costs based on collected runtime data in view of prior costs, and to generate one or more optimization options for resource allocation and utilization. Accordingly, the cost model interfaces with an infra-structure that is set-up and running, and assesses dynamic resource performance.

The director (158) performs a selective implementation of the generated resource optimization. As shown herein by way of example, the first cost model ($156_A$) is executed or otherwise processed to conduct the resource evaluation, or to create optimization options as output. By way of an example, first output ($156_{A,0}$) is shown operatively coupled to the executed first model ($156_A$). The director (158) leverages the first output ($156_{A,0}$) to generate one or more optimization options. As shown herein by way of example, the director (158) is operatively coupled to a set of optimization options ($158_{A,0}$), ($158_{A,1}$), and ($158_{A,2}$). Although only three optimization options are shown herein, the quantity should not be considered limiting. Each of the options is directed at optimization of resource utilization in view of the collected dynamic runtime data and corresponding cost assessment. The director (158) selectively implements one or more of the options, e.g. ($158_{A,0}$), ($158_{A,1}$), and ($158_{A,2}$), corresponding to optimization of one or more of the resources and responsive to the assessment. It is understood that the resource optimization includes a modification of the configuration of at least one of the resources. In an exemplary embodiment, the selective implementation of the options occurs during the resource modification.

In some illustrative embodiments, server (110) may be the IBM Watson® system available from International Business Machines Corporation of Armonk, N.Y., which is augmented with the mechanisms of the illustrative embodiments described hereafter. The collection module (152), the discovery module (154), the cost module (156), and the director (158), hereinafter referred to collectively as tools, are shown as being embodied in or integrated within the knowledge engine (150) of the server (110). In one embodiment, the AI tools may be implemented in a separate computing system (e.g., 190), or one or more client machines (180) and (182), that are connected across network (105) to the server (110). Wherever embodied, the knowledge engine (150) and corresponding tools (152), (154), (156), and (158) function to support dynamic resource cost modeling.

The client machines (180) and (182) operatively coupled to the server (110) may embody different types of information handling systems that can utilize the knowledge engine (150), ranging from small handheld devices, such as a handheld computer/mobile telephone to large mainframe systems. Examples of handheld computers include personal digital assistants (PDAs), personal entertainment devices, such as MP4 players, portable televisions, and compact disc players. Other examples of information handling systems include pen, or tablet computer, laptop, or notebook computer, personal computer system, and server. As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores. The nonvolatile data store(s) can be a component that is external to the various information handling systems or can be internal to one of the information handling systems.

The information handling system employed to support the knowledge engine (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, the information handling system may embody the north bridge/south bridge controller architecture, although it will be appreciated that other architectures may also be employed.

Figure 2:
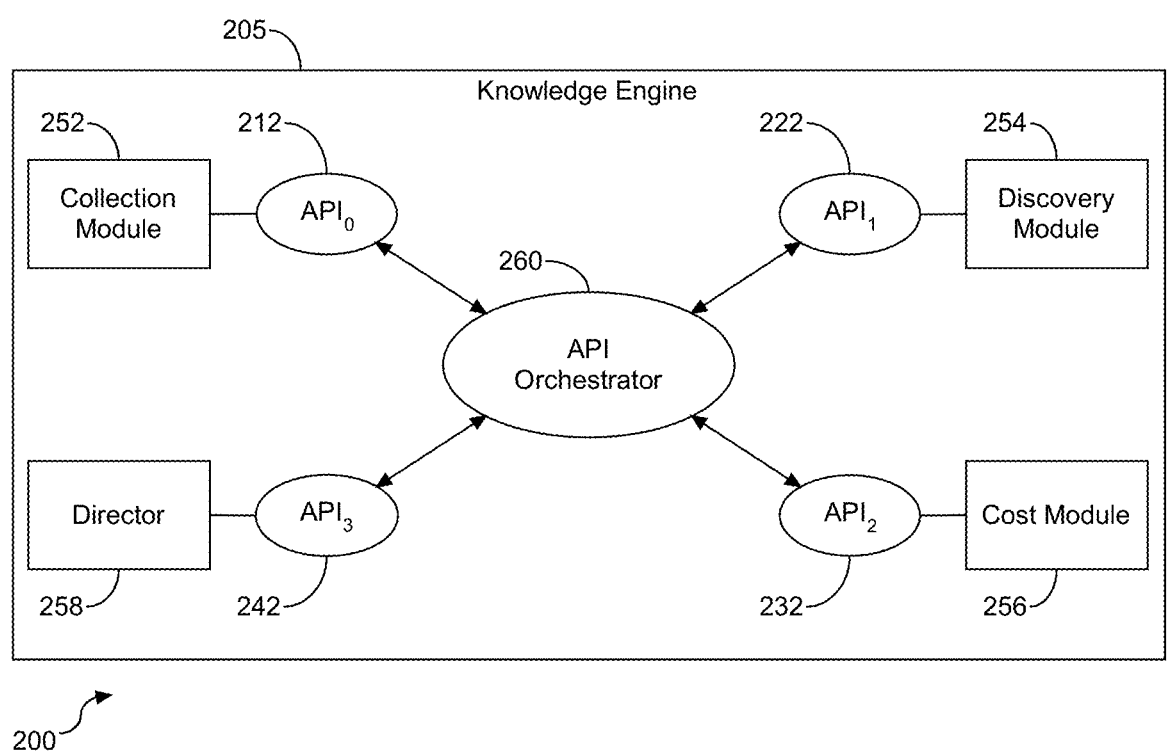
FIG. 2 depicts a block diagram illustrating the tools in FIG. 1 and associated application program interfaces (APIs).

An Application Program Interface (API) is understood in the art as a software intermediary between two or more applications. With respect to the knowledge engine (150)

and selective and dynamic resource optimization shown and described in FIG. 1, one or more APIs may be utilized to support one or more of the knowledge engine tools, including the collection module (152), the discovery module (154), the cost module (156), and the director (158). Referring to FIG. 2, a block diagram (200) is provided illustrating the knowledge engine and the associated APIs. As shown, a plurality of tools is embedded in the knowledge engine (205), with the tools including the collection module (252) associated with $API_0$ (212), the discovery module (154) associated with $API_1$ (222), the cost module (156) associated with $API_2$ (232), and the director (158) associated with $API_3$ (242). Each of the APIs may be implemented in one or more languages and interface specifications.

$API_0$ (212) provides support and functionality directed at collection of resources, and their corresponding configuration information, together with monitoring their runtime utilization and corresponding performance. $API_1$ (222) provides support and functionality directed at discovery of any changes to any one of the resources, and assessment of their configuration information. $API_2$ (232) provides support and functionality directed at deriving a hybrid cost model to account for the resources, and usage of the model to evaluate the resources. $API_3$ (242) provides support and functionality directed at generation of one or more resource utilization optimizations based on the evaluation, and selective implementation of one or more of the optimizations. As shown, each of the APIs (212), (222), (232), and (242) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
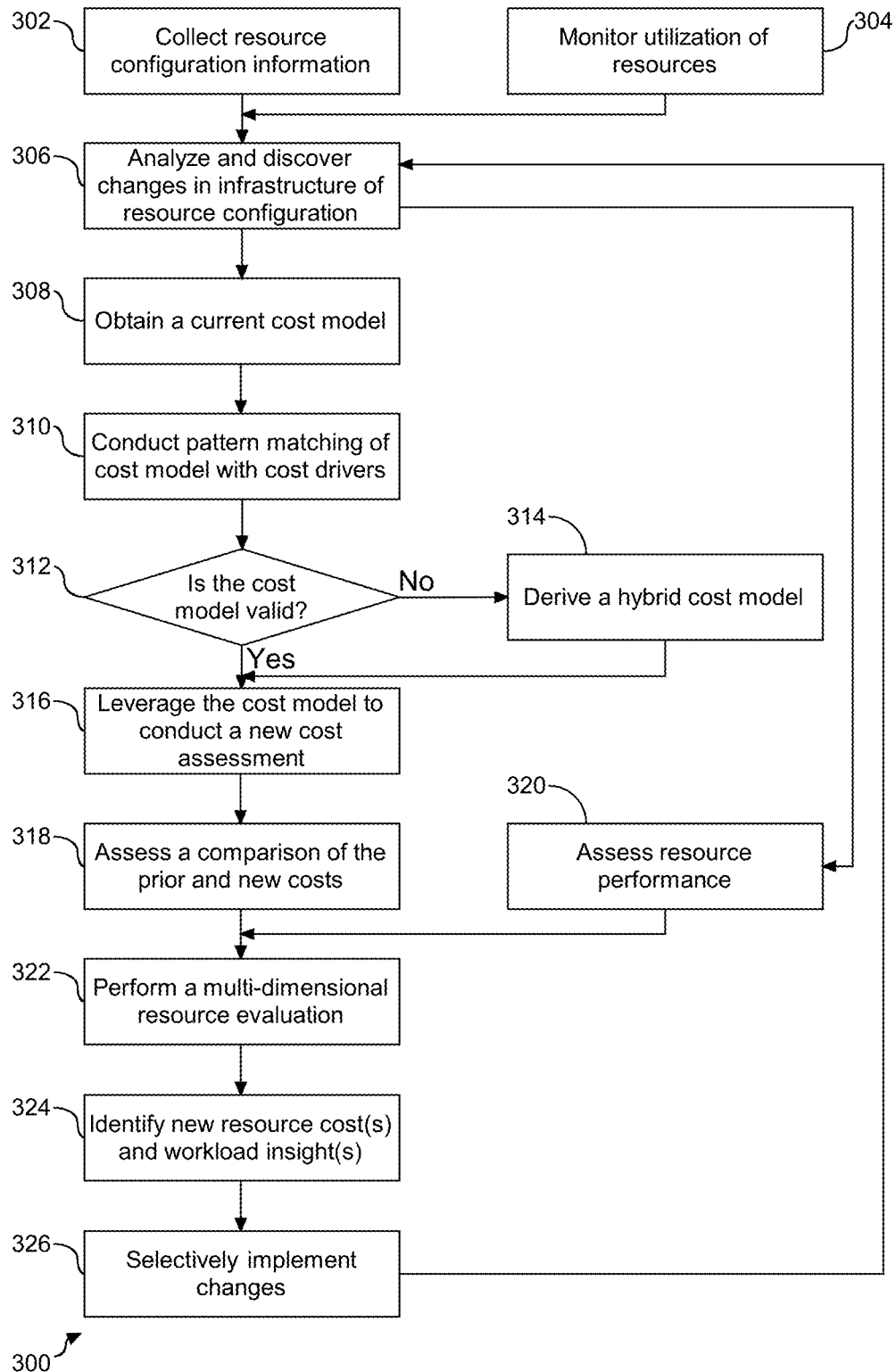
FIG. 3 depicts a flow chart illustrating a process for resource and performance monitoring, and dynamic modeling for resource assessment.

Referring to FIG. 3, a flow chart (300) is provided to illustrate a process for resource and performance monitoring and corresponding modeling for resource assessment. As shown and described herein, an information technology infrastructure embodied as a hybrid cloud environment is comprised of a selection, arrangement, and coordination of hardware resources. Resource configuration information is subject to collection (302). In an exemplary embodiment, one or more custom attributes are also subject to collection at step (302). As shown and described in FIG. 1, the custom attribute(s) are tags attached to resources or labels given to resources using information technology management tools from which the resource purpose or functionality can be derived. The aspect of configuration information collection takes place automatically. In an embodiment, the collected configuration information at step (302) is stored in a data structure, e.g. first data structure, as a current state of resources. An example of collected configuration information may be a quantity of virtual machines, quantity of central processing units (CPUs) per virtual machines, persistent storage space, etc. In an exemplary embodiment, the information collected at step (302) is stored in the $library_A$ ($162_A$). Parallel to the collection at step (302), the utilization of the resources is subject to monitoring (304) to collect corresponding performance data. In an exemplary embodiment, the performance data may be in the form of a quantity of CPUs or memory in use. In an embodiment, the collected utilization information at step (304) is stored in a data structure, e.g. second data structure, in $library_B$ ($164_B$) as current utilization information. The information collected at both steps (302) and (304) is analyzed to discover any changes in infrastructure of resource configuration (306). Accordingly, the initial aspect of the resource assessment is directed at collecting and monitoring resources allocated to the infrastructure.

Following analysis and discovery at step (306), two assessments are conducted. In an exemplary embodiment, the assessments are conducted in parallel. A configured infrastructure has a corresponding cost model, which in an embodiment may be an initial cost model corresponding to the resource configuration collected at step (302). The first assessment is directed at the cost model and applicability of the model to accurately reflect the infrastructure. A current cost model is obtained and a corresponding cost assessment is conducted with the cost model (308). In an exemplary embodiment, the current cost model generates output in the form of a cost for use of allocated resources. Following step (308) and the cost model generated output, a pattern matching of the cost model with the cost drivers is conducted (310). In an exemplary embodiment, a cost driver is a unit of activity that causes or endures costs. The pattern matching at step (310) is directed at an evaluation of the current cost model with known cost drivers. For example, at step (310) the evaluation determines if the cost model took into consideration known cost drivers to generate accurate output. It is understood in the art that cost patterns may change dynamically based on supply and demand. Following step (310), it is determined if the cost model obtained at step (308) is valid in view of the pattern matching (312). A negative response to the determination at step (312) is an indication that the cost model may not align with the cost drivers or that the cost patterns may have changed since the establishment of the cost model, and as such may require or suggest a revision of the cost model. As shown herein, the negative response from step (312) is followed by deriving a hybrid cost model to incorporate both the infrastructure and the cost drivers (314). In an exemplary embodiment, the pattern matching at step (310) identifies cost drivers that evolved since the establishment of the cost model, and the derived hybrid cost model is a modification or amendment of the cost model from step (308) to incorporate the identified cost drivers. Accordingly, the establishment of the cost model is subject to an evaluation and selectively modification to ensure that the cost model reflects the infrastructure and corresponding cost drivers.

Following a positive response to the determination at step (312) or following step (314), a cost model has been established shown herein to be either the model from step (308) or the derived hybrid cost model from step (314). A new or current cost assessment of the allocated resources is conducted using the established cost model (316), with the output from the established model generating output in the form of a new cost assessment. In an exemplary embodiment, the output may be a new price assessment for the allocated resources. A comparison of the prior or original cost(s), as assessed at step (308) is subject to a further assessment in view of the new or current costs (318). As shown and described herein, the infrastructure assessment is bifurcated. Parallel with the cost model and associated cost assessment, a dynamic routine is implemented to assess resource performance (320), which in an exemplary embodiment measures performance of hardware in view of the workload. An example of resource performance may be an evaluation of CPU or memory usage. Accordingly, as shown herein parallel paths are followed with one path directed at resource cost assessment and another path directed at performance measurement.

Output from the cost comparison assessment at step (318) and output from the performance assessment at step (320) are both utilized as input to multi-dimensional resource evaluation. In an exemplary embodiment, the multi-dimensional resource evaluation accounts for aspects of costs for allocation and usage of resource, as well as performance of the allocated resources to identify efficiency and operation of the resources in view of the workload. The evaluation is directed at identification of any changes to the resources that would optimize their utilization. As shown herein, the evaluation incorporates two separate elements, one element directed at a cost assessment and another element direct at a resource performance assessment in view of a corresponding workload, such as, but not limited to CPU usage, memory usage, and virtual machine size, to generate one or more recommendations to improve resource performance and cost savings (322), which creates output directed at new resource costs and workload insights (324). In an exemplary embodiment, the insight(s) at step (324) are resource optimization options or settings to improve performance of one or more resources or mitigate workload costs in view of the cost assessment and the workload requirements. As shown and described in FIG. 1, the hybrid model is derived from two or more cost models modified to address and incorporate the dynamic characteristics of the resources that are subject to change during utilization. In an exemplary embodiment, the hybrid cost model derivation includes the cost module identification of at least two known cost models based on current resource information. The evaluation at step (322) creates output in the form of new or revised costs and one or more recommendations to optimize resource utilization (324). Accordingly, the bifurcated evaluation incorporates dynamic infrastructure utilization and modeling to calculate costs for information technology resources. The multi-dimensional assessment shown and described and the corresponding output are subject to a selection and implementation (326). In an exemplary embodiment, the selection at step (326) may be user determined, or automated based on one or more parameters. Similarly, in an exemplary embodiment, the process shown herein may return to step (306) to receive updated infrastructure configuration and utilization data based on the selection and implementation and to discover any changes in infrastructure of resource configuration. Accordingly, the steps shown herein demonstrate cost calculation and performance evaluation for information technology resources through the lifecycle.

Figure 4:
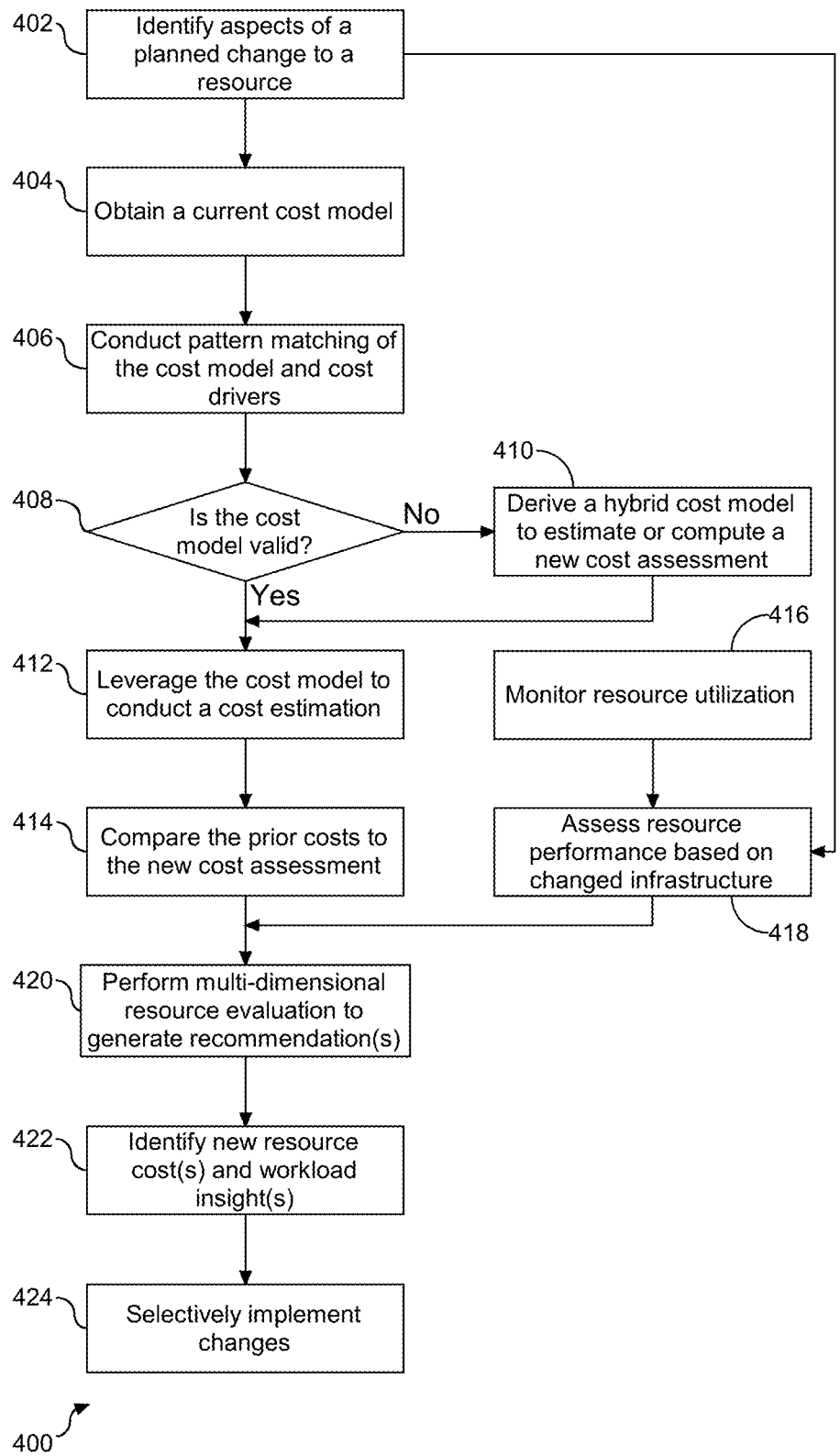
FIG. 4 depicts a flow chart illustrating a process for resource and performance monitoring for planned changes to a corresponding information technology infrastructure.

Referring to FIG. 4, a flow chart (400) is provided to illustrate a process for resource and performance monitoring for planned changes to a corresponding information technology infrastructure. As shown, a planned change to a resource in the information technology infrastructure takes place and aspects of change(s) are identified (402). Similar to FIG. 3, the process is bifurcated. In a first path of the bifurcation, a cost assessment is conducted, and in a second path a resource performance assessment is conducted. With respect to the cost assessment, the first assessment is directed at the cost model and applicability of the model to accurately reflect the infrastructure in view of the planned change. A current cost model is obtained (404), followed by conducting a pattern matching of the cost model with the cost drivers (406). It is understood in the art that cost patterns may change dynamically based on supply and demand regardless of the planned change. Following step (406), it is determined if the cost model is valid in view of the pattern matching associated with the cost drivers (408). A positive response to the determination at step (408) indicates that the cost model is still valid and the process returns to step (412) to leverage the valid cost model, e.g. current cost model, to conduct a cost estimation of the planned resource(s) allocation. A negative response to the determination at step (408) is followed by deriving a hybrid cost model to estimate or compute a new cost assessment, with the derived hybrid cost model incorporating both the changed infrastructure and the cost drivers (410), and then leveraging the new cost model to conduct a cost estimation of the allocated resources with the new cost model (412). The prior or original costs are subject to comparison with the new or current costs assessment (414). Accordingly, planned changes of one or more resources in the infrastructure are processed through a cost evaluation to maintain a current view of the cost associated with the change(s).

As shown and described herein, the infrastructure assessment is bifurcated. Parallel with the cost model and associated cost assessment, a dynamic routine is implemented to monitor utilization of the resources (416), followed by an assessment resource performance (418). As shown, at step (418) input includes both planned resource configuration changes (402) and the monitored resource utilization from step (416) in order to assess resource performance based on planned infrastructure changes (418). An example of resource performance may be an evaluation of CPU or memory usage. Output from the cost comparison assessment at step (414) and output from the performance assessment at step (418) are both utilized as input to multi-dimensional resource evaluation to generate one or more recommendations to improve resource performance (420), which creates output directed at new resource costs, e.g. cost savings, and workload insights (422). As shown and described in FIG. 1, the hybrid model (410) is derived from two or more cost models modified to address and incorporate the dynamic characteristics of the resources that are subject to change during utilization, including planned infrastructure changes. In an exemplary embodiment, the hybrid cost model derivation includes the cost module identification of at least two known cost models based on current resource information. The evaluation at step (420) creates output in the form of new or revised costs and one or more recommendations to optimize resource utilization (422). Although the changes shown and described herein are planned changes, output from the hybrid cost model may provide alternative or modified configuration settings for the infrastructure in view of cost and/or performance. Accordingly, the bifurcated evaluation incorporates dynamic infrastructure utilization and modeling to calculate costs for information technology resources.

The multi-dimensional assessment shown and described and the corresponding output are subject to a selection and implementation (424). In an exemplary embodiment, the selection at step (424) may be user determined, or automated based on one or more parameters. If it is determined at step (424) that the output meets the one or more parameters, then the output is applied to the information technology infrastructure. If the output does not meet the one or more parameters at step (424) the output is not applied to the infrastructure. For example, in an exemplary embodiment, application of one or more resource may yield an increase in cost, or may yield a performance improvement. The selective implementation at step (424) may be conducted based on an analysis or corresponding protocol directed at performance improvement versus cost increase. Accordingly, the steps shown herein demonstrate cost calculation and performance evaluation for information technology resources through the lifecycle and responsive to a planned or scheduled infrastructure modification.

As shown and described in FIGS. 3 and 4, a cost model is derived to conduct a multi-dimensional assessment of the infrastructure. Several cost models are known in the art and characterized based on the configuration, including standardized models and flexible models. In an exemplary embodiment, the standardized model is referred to herein as a t-shirt model and the flexible model is referred to as a unit cost model. In an exemplary embodiment, the standardized model may identify resource configurations optimal to perform certain tasks, e.g., computing intensive tasks, memory intensive tasks, storage intensive tasks, etc., or identify standardization of resource configuration for general tasks. For example, 32×2.0 GHz CPU, 32 GB RAM, 25 GB storage (computing intensive t-shirt size) and 16×2.0 GHz CPU, 128 GB RAM, 25 GB storage (memory intensive t-shirt size). Similarly, in an exemplary embodiment, the unit cost model identifies costs per resource allocated, such as cost per virtual machine in a defined time period, storage cost per gigabyte, memory cost per gigabyte, CPU cost, etc.

Figure 5A:
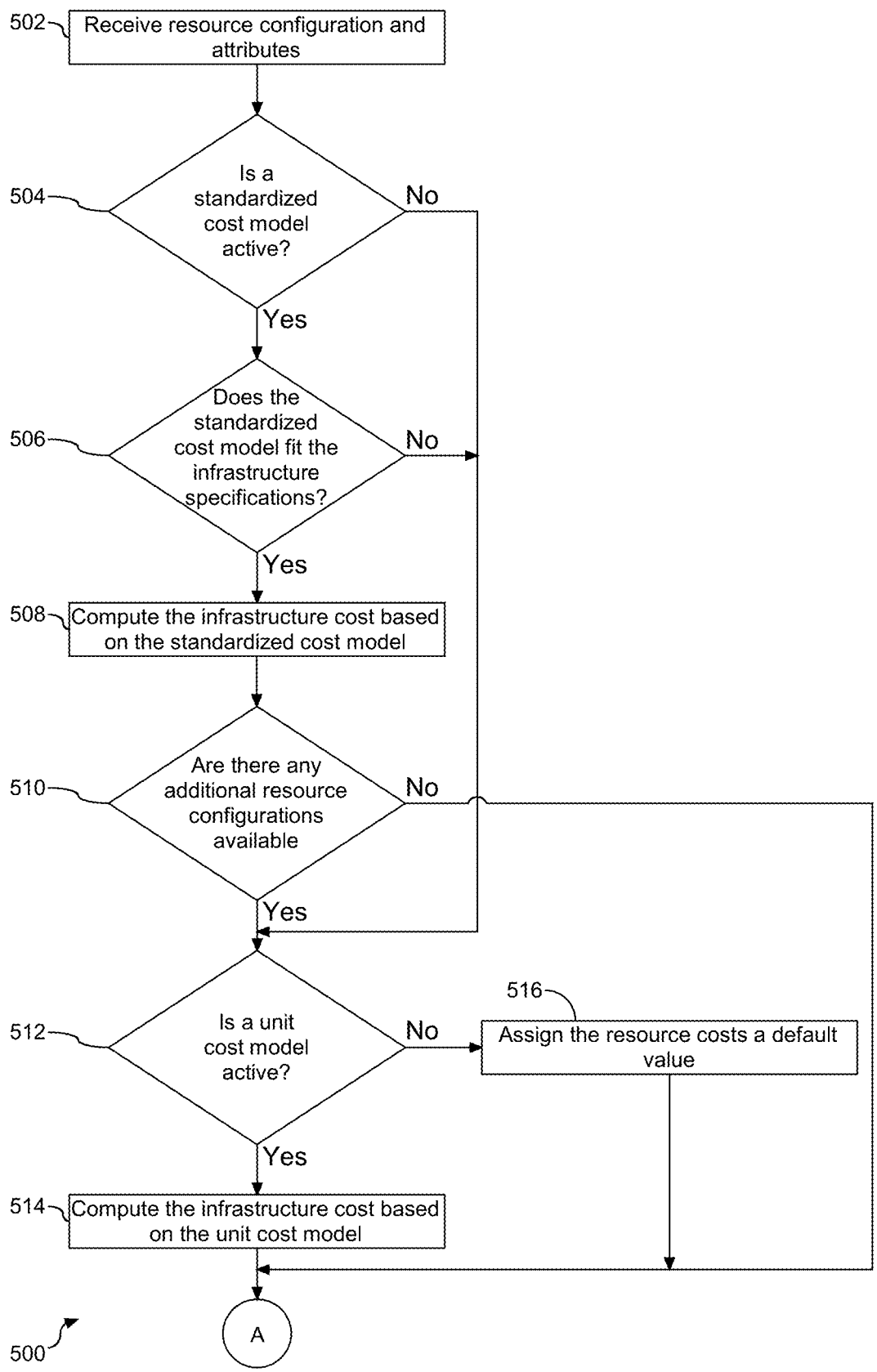
FIGS. 5A and 5B depict a flow chart illustrating a process for deriving a custom multi-dimensional model reflecting the resources of the IT infrastructure.
Figure 5B:
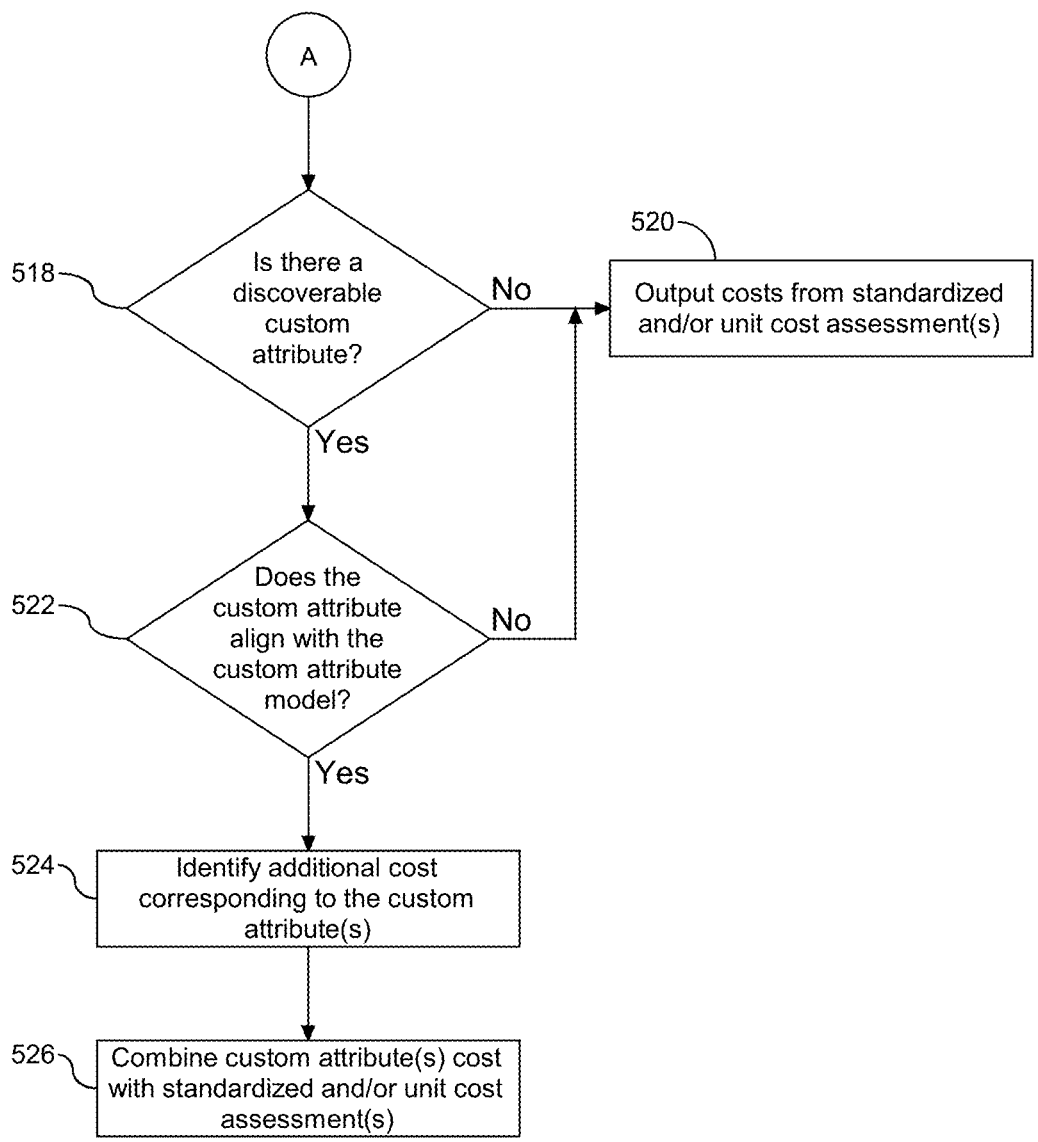

Referring to FIGS. 5A and 5B, a flow chart (500) is provided illustrating a process for deriving a custom multi-dimensional model. As shown herein, input in the form of resource configuration and attributes are received or provided based on runtime of the information technology infrastructure (502). It is then determined if a corresponding standardized cost model is active (504). A positive response to the determination at step (504) is followed by a determination to assess or identify if the corresponding standardized cost model fits with the infrastructure specifications (506). A positive response to the determination at step (506) is followed by computing the infrastructure cost of the allocated resources based on the standardized cost model (508). Accordingly, the initial assessment shown and described herein is directed at one aspect of the infrastructure modeling.

Following the initial assessment at step (508), it is determined if there are any additional resource configurations available (510). A positive response to the determination at step (510) or a negative response to the determination at steps (504) or (506) is followed by a determination with respect to a unit cost model and to identify if such a model is active (512). A positive response to the determination at step (512) is followed by computing the infrastructure cost using the identified active unit cost model (514). In an embodiment, if both the standardization cost model and the unit cost model are active, then the cost computed at step (514) is only for those resource configurations that do not match the standardization model at step (508). A negative response to the determination at step (512) is followed by the resource(s) cost being assigned default value (516).

Following either a negative response to the determination at step (510), or following steps (514) or (516), a determination is conducted to identify a status of a corresponding and discoverable custom attribute (518). As shown and described in FIG. 1, the custom attribute may be one or more tags attached to resources or labels given to resources using information technology management tools from which the resource purpose or functionality can be derived. If at step (518) it is determined that there is no discoverable custom attribute for the infrastructure or in an exemplary embodiment a corresponding model directed at a discovered custom attribute is inactive, then the cost assessment(s) computed from the standardized cost model and/or the unit cost model at steps (508), (514), or (516) are generated at the outputted resource cost (520). However, if at step (518) it is determined that a custom attribute has been discovered, it is then determined if the discovered custom attribute(s) aligns with a corresponding custom attribute cost model (522). A negative response to the determination at step (522) indicates that the output from the custom multi-dimensional model could not be matched and the process continues to step (520) to assess the cost based on the standardized cost model and/or the unit cost model at steps (508), (514), or (516). However, a positive response to the determination at step (522) is followed by an assessment or identification of the additional cost corresponding to the custom attribute(s) (524) and combining those costs with the computed cost assessments from steps (508), (514), or (516), with the sum of the costs being outputted as the resource cost (526). Responsive to the discovery of a custom attribute and further alignment of the custom attribute, the resource costs from the custom multi-dimensional model are generated as output. Accordingly, as shown herein, the multi-dimensional modeling selectively incorporates elements from a standardized cost model, a unit cost model, and a custom attribute model effectively formulating a hybrid model.

As shown and described in FIGS. 1-5B, resource lifecycle costing in a hybrid shared resource environment is derived utilizing a costing model and incorporation of dynamic adjustment of the derived model responsive to dynamic modification of one or more of the resources. Aspects of dynamic adjustment of the derived model responsive to dynamic modifications are shown and described with the tools and APIs shown in FIGS. 1 and 2, and the processes shown in FIGS. 3, 4, and 5. Aspects of the functional tools (152)-(158) and their associated functionality may be embodied in a computer system/server in a single location, or in one embodiment, may be configured in a cloud-based system sharing computing resources. With references to FIG. 6, a block diagram (600) is provided illustrating an example of a computer system/server (602), hereinafter referred to as a host (602) in communication with a cloud-based support system, to implement the processes described above with respect to FIGS. 3-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments (610) where tasks are performed by remote processing devices that are linked through a communications network. In a distributed cloud computing environment, program modules may be located in both local and remote computer system storage media including memory storage devices.

Figure 6:
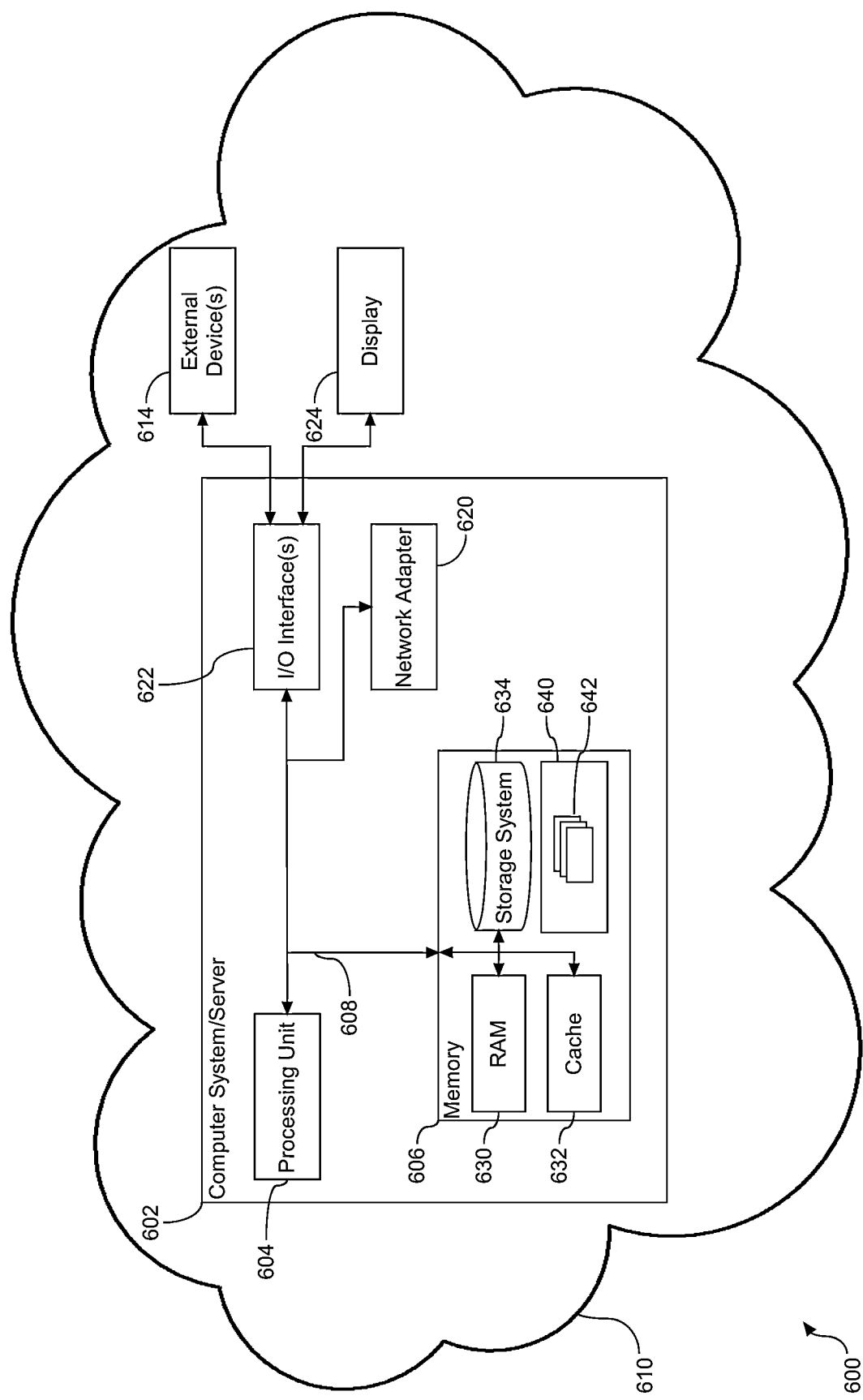
FIG. 6 depicts a block diagram illustrating an example of a computer system of a cloud based support system, to implement the system and processes described above with respect to FIGS. 1-5B.

As shown in FIG. 6, host (602) is shown in the form of a general-purpose computing device. The components of host (602) may include, but are not limited to, one or more processors or processing units (604), e.g. hardware processors, a system memory (606), and a bus (608) that couples various system components including system memory (606) to processing unit (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments to support and enable resource lifecycle costing with further dynamic adjustment of the derived costing model responsive to dynamic modification of one or more of the resources. For example, the set of program modules (642) may include the tools (152)-(158) as described in FIG. 1.

Host (602) may also communicate with one or more external devices (614), such as a keyboard, a pointing device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In one embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system. In one embodiment, host (602) is a node of a cloud computing environment.

Figure 7:
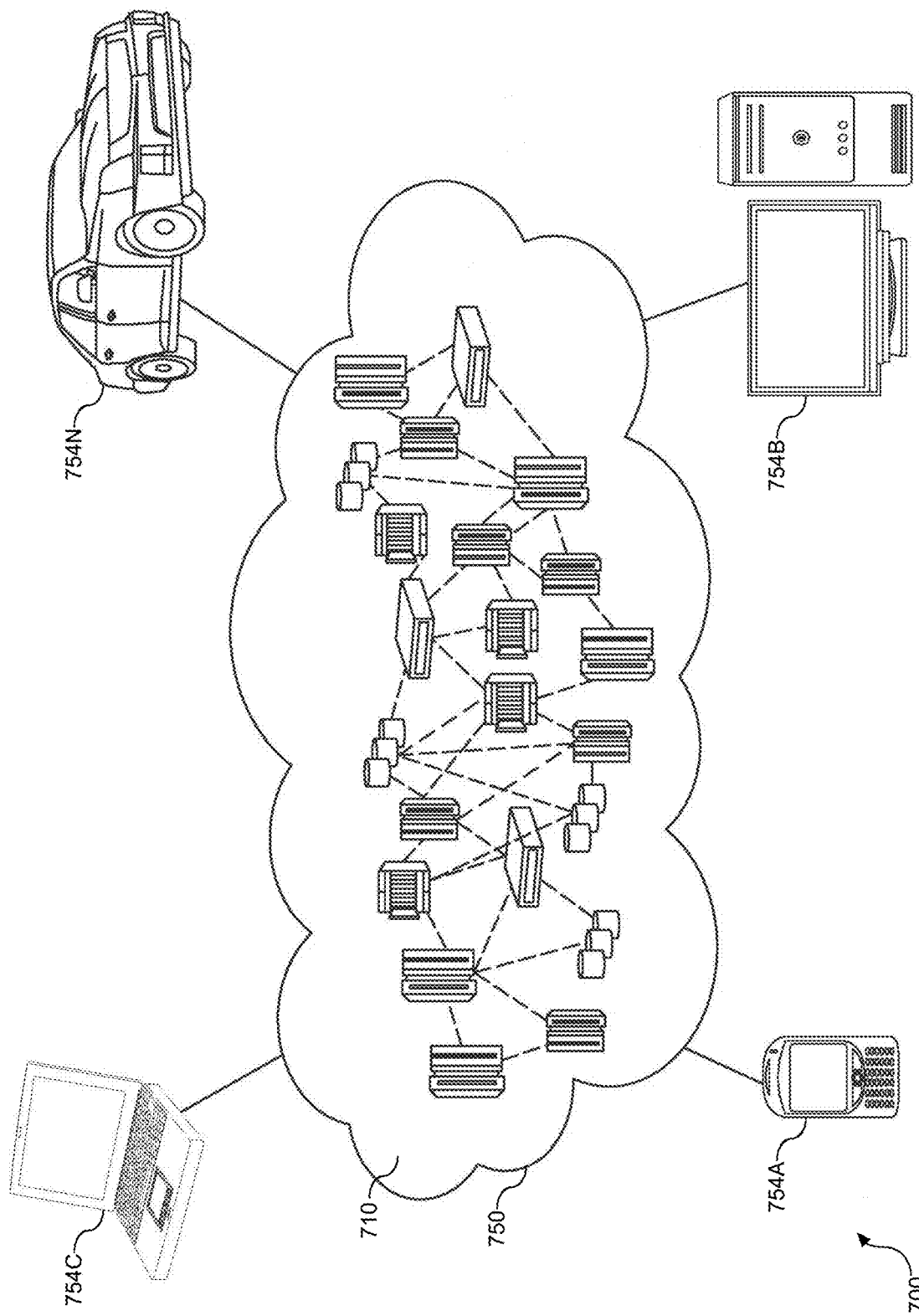
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
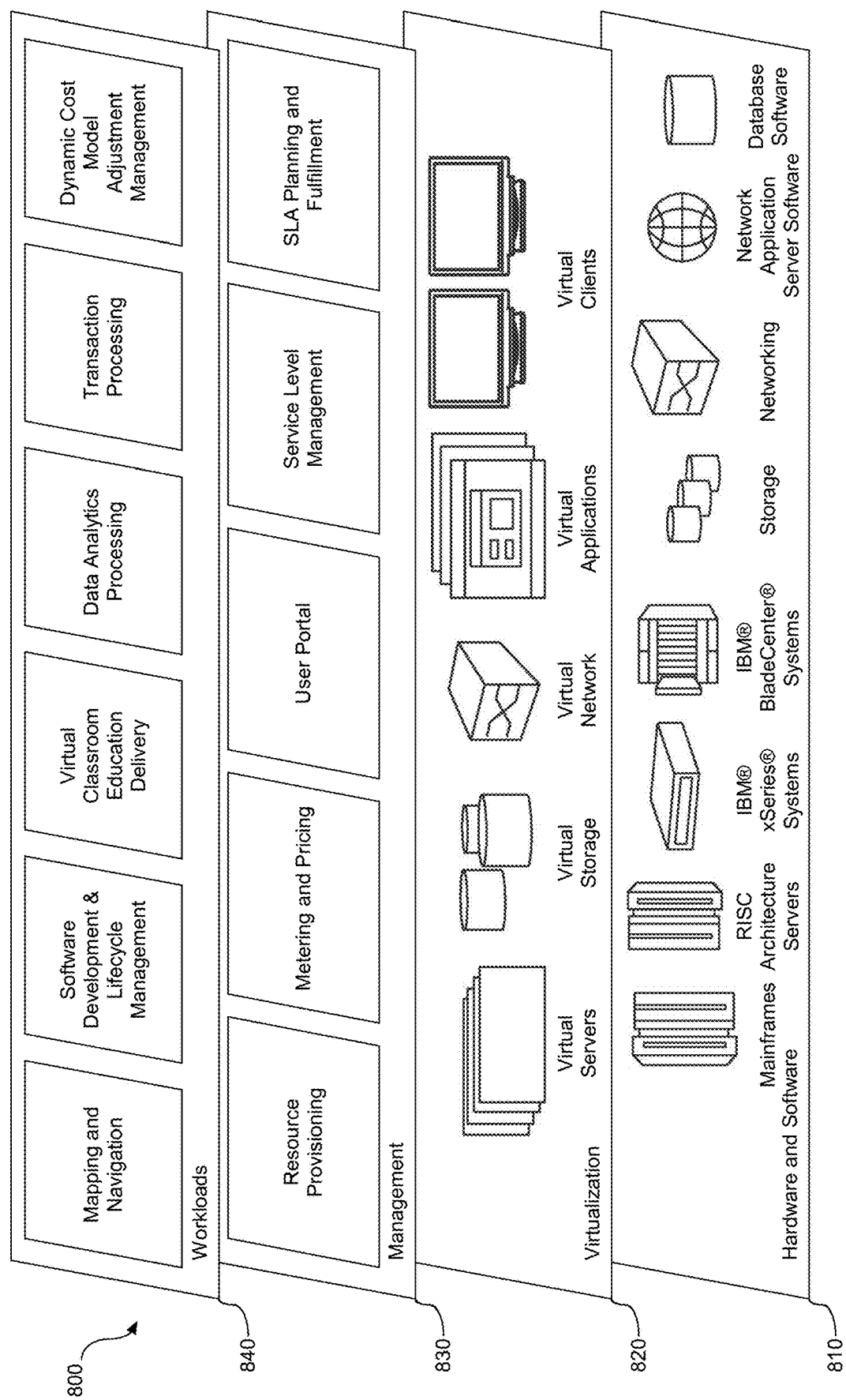
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840).

The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and dynamic cost model adjustment management.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to improve the functionality and operation of dynamic adjustment of resource cost model responsive to dynamic modification of one or more of the resources.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, natural language processing may be carried out by different computing platforms or across multiple devices. Accordingly, the scope of protection of the embodiments is limited only by the following claims and their equivalents.

What is claimed is:

1. A computer system comprising:
   a processor operatively coupled to memory, the processor configured to:
   collect resource information and corresponding configuration information in parallel with monitoring runtime utilization of resource performance;
   discover one or more changes to one or more resources, and assess changed configuration information corresponding to the changed one or more resources;
   derive a cost model to account for the discovered one or more changes to the one or more resources; and
   leverage the derived cost model as a component of a multi-dimensional resource evaluation, and generate resource utilization optimization as output.

2. The computer system of claim 1, wherein the processor configured to derive the cost model includes the processor configured to identify and dynamically assess at least two formatives of cost models based on the discovered one or more resource changes, and selectively incorporate one or more elements from the identified model formatives into the cost model.

3. The computer system of claim 2, wherein the processor is configured to dynamically collect the resource information during runtime and apply the dynamically collected resource information to the derived cost model.

4. The computer system of claim 3, wherein the processor is configured to dynamically modify the derived cost model responsive to the applied resource information, wherein the dynamic modification accounts for custom attribute costing.

5. The computer system of claim 1, wherein the processor is configured to selectively implement the generated resource utilization optimization of the one or more resources responsive to the assessment.

6. The computer system of claim 5, wherein the processor is configured to selectively implement the generated resource utilization optimization during resource configuration modification.

7. The computer system of claim 1, wherein the processor is configured to infer the resource information through one or more custom attributes.

8. A computer program product to support resource management, the computer program product comprising:
   a computer readable storage medium having program code embodied therewith, the program code executable by a processor to:
   collect resource information and corresponding configuration information in parallel with monitoring runtime utilization of resource performance;
   discover one or more changes to one or more resources, and assess changed configuration information corresponding to the changed one or more resources;
   derive a cost model configured to account for the discovered one or more changes to the one or more resources; and
   leverage the derived cost model as a component of a multi-dimensional resource evaluation, and generate resource utilization optimization as output.

9. The computer program product of claim 8, wherein the program code to derive the cost model includes program code executable by the processor to identify and dynamically assess at least two formatives of cost models based on the discovered one or more resource changes, and selectively incorporate one or more elements from the identified model formatives into the cost model.

10. The computer program product of claim 9, further comprising program code executable by the processor to dynamically collect resource configuration information during runtime and apply the dynamically collected resource information to the derived cost model.

11. The computer program product of claim 10, further comprising the program code executable by the processor to dynamically modify the derived cost model responsive to the applied resource information, wherein the dynamic modification accounts for custom attribute costing.

12. The computer program product of claim 8, further comprising program code executable by the processor to selectively implement the generated resource utilization optimization of the one or more resources responsive to the assessment.

13. The computer program product of claim 12, wherein selective implementation of resource utilization optimization occurs during resource configuration modification.

14. The computer program product of claim 8, further comprising program code executable by the processor to infer the resource information through one or more custom attributes.

15. A computer-implemented method comprising:
collecting resource information and corresponding configuration information in parallel with monitoring runtime utilization of resource performance;
discovering one or more changes to one or more resource, and assessing changed configuration information corresponding to the changed one or more resources;
deriving a cost model accounting for the discovered one or more changes to the one or more resources; and
leveraging the derived cost model as a component of a multi-dimensional resource evaluation, and generating resource utilization optimization as output.

16. The method of claim 15, wherein the deriving the cost model includes identifying and dynamically assessing at least two formatives of cost models based on the discovered one or more resource changes, and selectively incorporating one or more elements from the identified model formatives into the cost model.

17. The method of claim 16, further comprising dynamically collecting resource configuration information during runtime and applying the dynamically collected resource information to the derived cost model.

18. The method of claim 17, further comprising dynamically modifying the derived cost model responsive to the applied resource information, wherein the dynamic modification accounts for custom attribute costing.

19. The method of claim 15, further comprising selectively implementing the generated resource utilization optimization of the one or more resources responsive to the assessing.

20. The method of claim 15, wherein the collecting resource information and corresponding configuration information includes inferring the resource information through one or more custom attributes.

* * * * *